United States Patent [19]
Zielinski

[11] Patent Number: 5,664,810
[45] Date of Patent: Sep. 9, 1997

[54] FIREPROOF ELECTRICAL WIRE HOUSING

[75] Inventor: Edward Zielinski, Kent, Wash.

[73] Assignee: The Boeing Company, Seattle, Wash.

[21] Appl. No.: 533,952

[22] Filed: Sep. 26, 1995

[51] Int. Cl.⁶ .................................................. F16L 39/00
[52] U.S. Cl. .................. 285/152.1; 285/192; 285/136.1; 285/294.4; 285/423
[58] Field of Search ................................ 285/192, 158, 285/294, 297, 236, 137.1, 423

[56] References Cited

U.S. PATENT DOCUMENTS

| | | | |
|---|---|---|---|
| 2,438,412 | 3/1948 | Morris | 285/158 X |
| 2,813,692 | 11/1957 | Bremer et al. | 285/294 X |
| 3,224,796 | 12/1965 | Burkitt | 285/294 X |
| 3,529,664 | 9/1970 | Baker et al. | 285/236 X |
| 3,548,079 | 12/1970 | Jones et al. | 285/158 X |
| 3,761,601 | 9/1973 | Kaesser et al. | 285/158 X |
| 4,086,736 | 5/1978 | Londrigan | 285/192 X |
| 4,291,905 | 9/1981 | Schrock . | |
| 4,420,176 | 12/1983 | Cornwall | 285/158 |
| 4,431,198 | 2/1984 | Beinhaur et al. | 285/192 X |
| 4,894,966 | 1/1990 | Bailey | 285/158 X |
| 5,129,684 | 7/1992 | Lawrence et al. | 285/192 X |

FOREIGN PATENT DOCUMENTS 3157586  7/1991  Japan ........................ 285/192

*Primary Examiner*—Dave W. Arola
*Attorney, Agent, or Firm*—Christensen, O'Connor, Johnson & Kindness PLLC

[57] ABSTRACT

A fireproof electrical wire housing (9) for routing electrical wires through a barrier wall, such as an aircraft bulkhead (21), without destroying the fireproof and hermetic functions of the bulkhead (21) is disclosed. The fireproof electrical wire housing (9) includes a sleeve (13) which surrounds a wire bundle (11) and a tubular housing (19). The tubular housing (19) includes a cover plate (17) that is mounted to the bulkhead(21). Thereafter, the sleeve (13) is inserted into the tubular housing (19). Holes (35) penetrating the wall of the sleeve (13) are used to inject a sealant into a cavity (39) in the sleeve (13) to prevent vapors and flames from passing through the fireproof electrical wire housing (9).

12 Claims, 3 Drawing Sheets

FIREPROOF ELECTRICAL WIRE HOUSING

FIELD OF THE INVENTION

This invention relates to methods and apparatus for maintaining fire and hermetic isolation between two zones and, more particularly, methods and apparatus that allow electrical or other conduits to pass through a barrier wall that separates one zone from another zone without destroying the fire and hermetic functions of the barrier wall.

BACKGROUND OF THE INVENTION

While, as will be understood from the following description, the present invention was developed for routing wire bundles through the barrier walls of an aircraft that separate one zone of aircraft from another, adjacent zone, this invention may also find utility in other environments.

The zones of an aircraft containing propulsion systems and equipment, such as auxiliary power units and engines, must be isolated from other zones of the aircraft. The purpose is to isolate zones containing equipment susceptible to initiating and/or maintaining a fire from other zones. Isolation is usually created by barrier walls, such as firewalls, shrouds, or bulkheads, that are designed to provide fire and hermetic protection between adjacent zones. In many instances, electrical connections must be made to the isolated equipment. This requires that an electrical path be created through the separating barrier wall. Current aircraft design practice dictates that fireproof and hermetically sealed electrical connectors be mounted on barrier walls when an electrical path through a barrier wall is required. The use of connectors preserves the fire and hermetic functions of the barrier walls. More specifically, the connectors maintain the barrier between a zone that is susceptible of initiating and/or maintaining a fire, i.e., a fire zone, from the adjacent zone.

The current use of electrical connectors on barrier walls has many disadvantages. First, electrical connectors degrade the integrity of electronic signals. Second, electrical connectors are expensive and contribute unnecessary weight to aircraft. As a result, aircraft payload capacity dishes. Third, the installation of electrical connectors in barrier walls is labor intensive and time consuming. Problems such as difficulty in correctly identifying wire bundles, establishing correct routing lengths and overcrowding of mounted connectors often arise. Moreover, the number and small size of the fasteners, i.e., nuts, bolts, and washers, required to mount connectors unduly delay installation.

The present invention is directed to overcoming the foregoing and other disadvantages. More specifically, the present invention is directed to providing a method and apparatus for routing a wire bundle and the like through a barrier wall such as the bulkhead of an aircraft in a manner that preserves the fireproof and hermetic functions of the wall without the use of electrical connectors and their attendant disadvantages.

SUMMARY OF THE INVENTION

In accordance with this invention, a method and apparatus for routing electrical conduit, such as a wire bundle, through a barrier wall without destroying the fireproof and hermetic functions of the barrier wall is provided. The Apparatus includes a tubular housing mounted in a hole in the barrier wall surrounded by a cover plate fastened to the wall around the housing and a sleeve that surrounds the electrical conduit (i.e., the wire bundle) mounted in the tubular housing. The apparatus also includes a sealant injected into a cavity in the sleeve after the sleeve is positioned in the tubular housing. The tubular housing, sleeve and sealant are all formed of noncombustible materials.

In accordance with other aspects of this invention, both the tubular housing and the sleeve are cylindrical.

In accordance with further aspects of this invention, the dimension of the inner diameter of the sleeve is dependent on the size of the wire bundle. The dimension of the outer diameter is such that the sleeve fits snugly in the housing In accordance with yet other aspects of this invention, the cavity includes at least one hole penetrating the sleeve wall to permit the sealant to be injected into the cavity from outside the sleeve.

In accordance with still further aspects of this invention, the Sleeve includes a circular protrusion at one end that prevents the sleeve from sliding completely through the housing.

In accordance with yet still other aspects of this invention, the sleeve is a composite. The composite is laid up and molded, or formed, in a conventional manner.

As will be readily appreciated from the foregoing summary, the invention provides a new and improved method and apparatus for routing electrical wire and other types of conduits through a barrier wall without destroying the fireproof and hermetic functions of the barrier wall. Because the method and apparatus does not require the use of connectors, such as electrical connectors, the disadvantages associated with the use of connectors, briefly described above, are avoided. Specifically, the integrity of electrical signals passing through the wire is not degraded by unnecessary connectors. Further, the expense and time associated with the purchase and installation of electrical connectors is avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
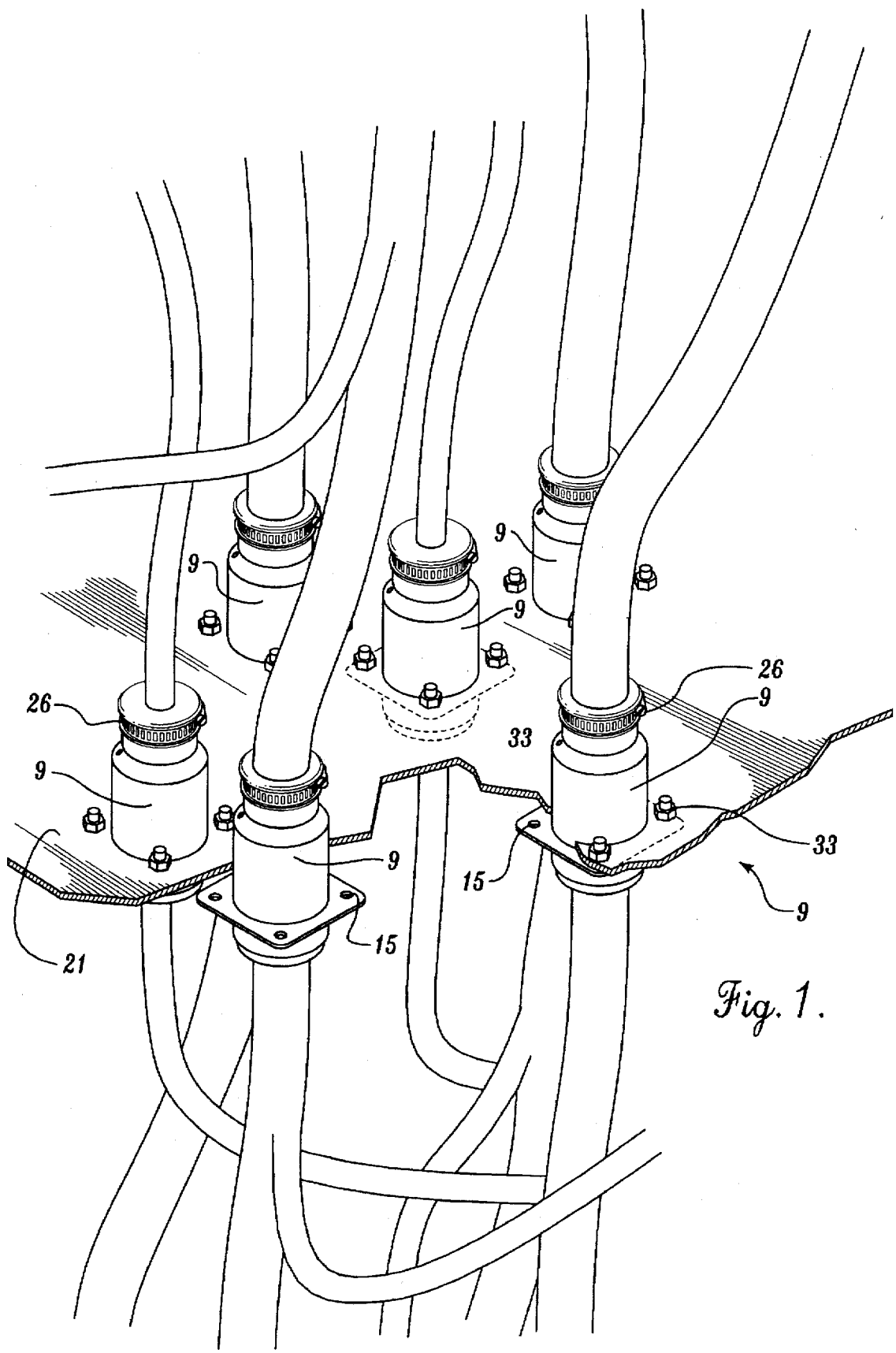
FIG. 1 is a pictorial diagram illustrating a plurality of fireproof electrical wire housings formed in accordance with this invention mounted in a bulkhead.

FIG. 1 is a pictorial view of a plurality of fireproof electrical wiring housings 9 formed in accordance with this invention mounted in a barrier wall, such as an aircraft bulkhead 21. As shown better in FIGS. 2 and 3, each fireproof electrical wiring housing 9 includes a sleeve 13 and a housing 19. The housing includes a a tubular body 18 and a cover plate 17. The cover plate is used to attach the fireproof electrical wire housings 9 to the bulkhead 21. More specifically, the cover plate 17 forms a flange that surrounds and extends outwardly from the tubular body 18. While the plane of the cover plate 17 is depicted as lying orthogonal to the longitudinal axis of the tubular body 18, it is to be understood that the plane of the cover plate could be angled with respect to the longitudinal axis of the tubular body 18. Further, while the illustrated cover plate has a rectangular shape, it is to be understood that the cover plate can have other shapes-circular, for example. In any event, the cover plate 17 includes a plurality of holes 15 that are used to fasten the cover plate and, thus, the housing 19 to the bulkhead 21 in the manner described below.

Figure 2:
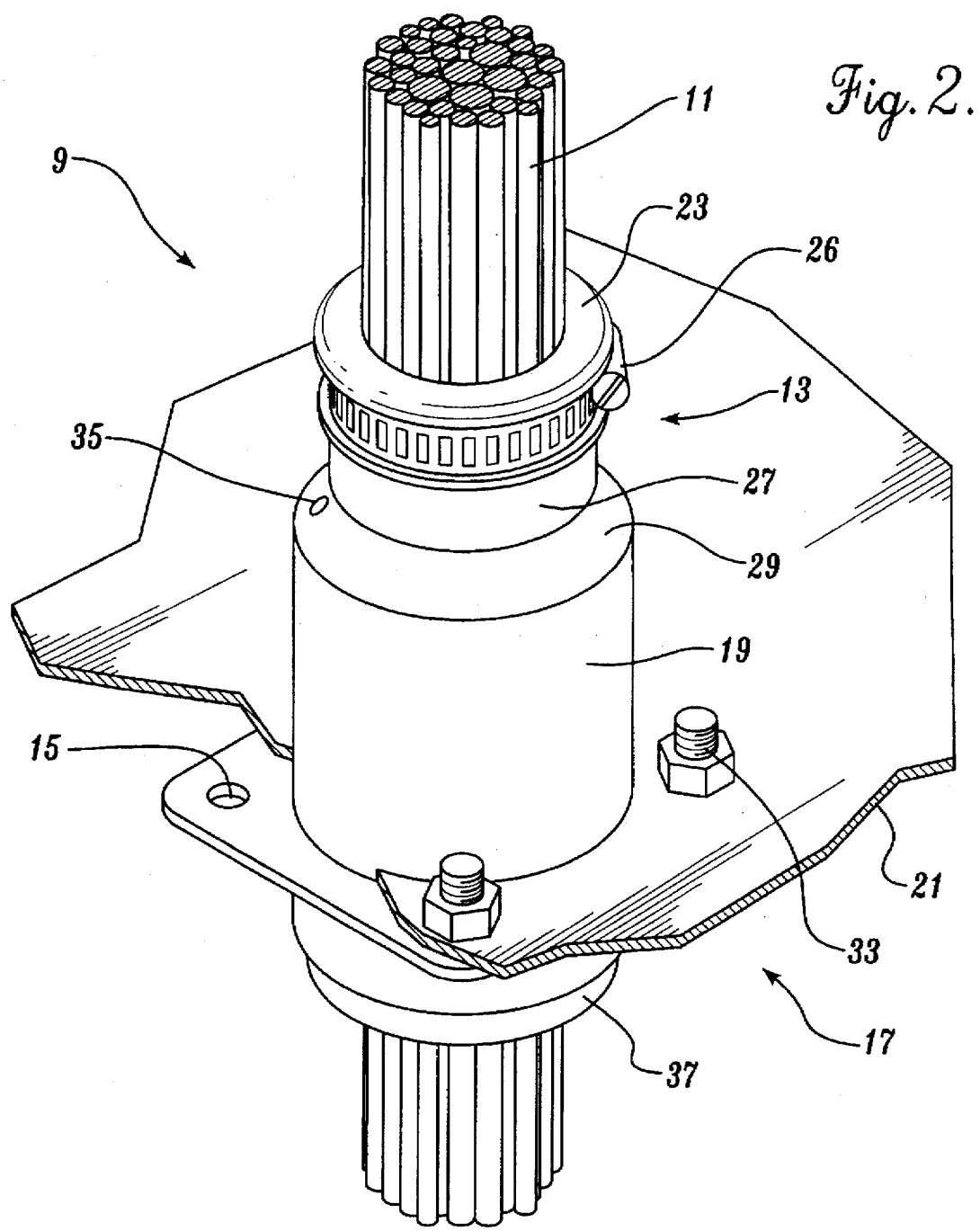
FIG. 2 is a pictorial diagram of a single fireproof electrical wire housing formed in accordance with this invention mounted in a bulkhead.

As shown in FIGS. 1 and 2, the preferred shape of the sleeve 13, and the tubular body 18 of the housing 19, is cylindrical. Other shapes can, of course, be used. For example, the sleeve and tubular body could have square or rectangular shapes when viewed in cross section.

Figure 4:
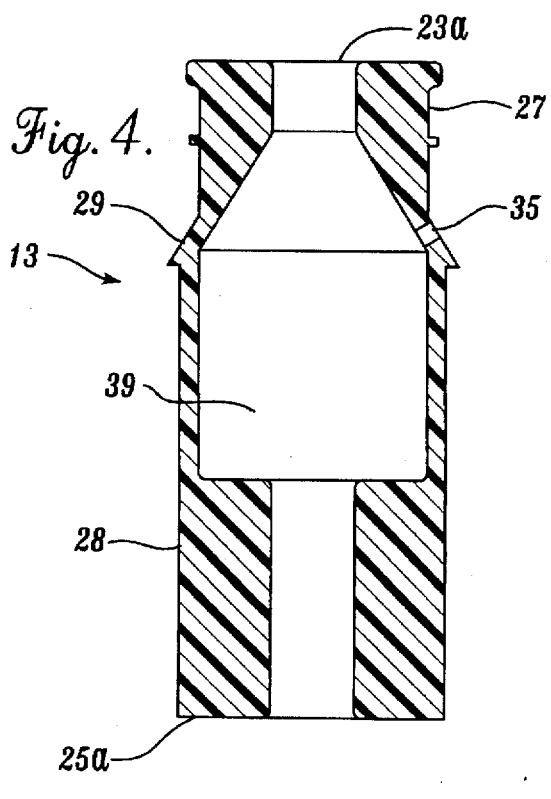
FIG. 4 is an exploded is a longitudinal cross-sectional view one embodiment of a sleeve of a fireproof electrical wire housing formed in accordance with this invention.
Figure 5:
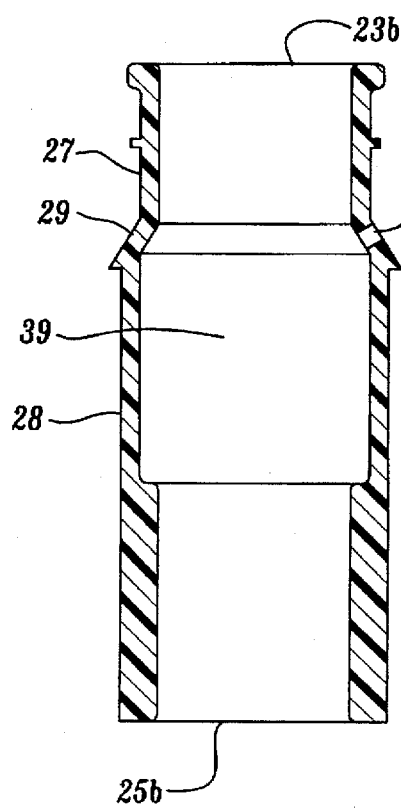
FIG. 5 is a longitudinal cross-sectional view of an alternative embodiment of a sleeve of a fireproof electrical wire housing formed in accordance with this invention.

Regardless of cross-sectional shape, the sleeve 13 includes a central cavity through which one or more wires 11 pass. As illustrated in FIGS. 4 and 5 and described below, the size of the central cavity is dependent on the size and number of wires.

One end of the sleeve 13 includes a neck 27, whose outer diameter is less than the diameter of the main body 28 of the sleeve. The length of the neck 27 is sufficient to allow a compression clamp 26 positioned around the neck to compress the neck against wires passing through the neck. The compression clamp aids in temporarily securing the neck 27 of the sleeve 13 to the wires 11.

A conical section 29 lies between the main body 28 of the sleeve 13 and the neck 27. The diameter Of the base of the conical section 29, which joins the main body 28, is slightly greater than the diameter of the body portion. As a result, a slight protrusion exists where the conical section 29 joins the main body 28.

Figure 3:
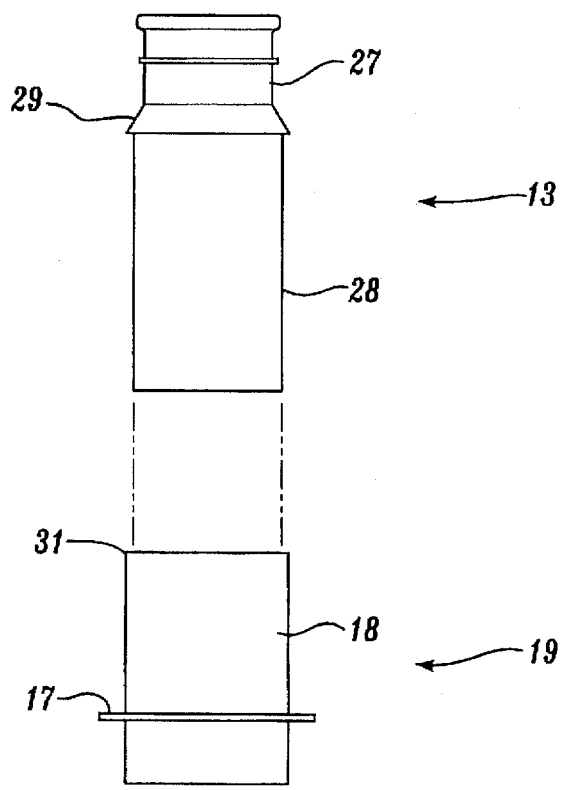
FIG. 3 is an exploded view era tubular housing and a sleeve of a fireproof electrical wire housing formed in accordance with this invention.

The diameter of the main body 28 of the sleeve 13 is sized such that the main body can slide into the interior of the tubular body 18 of the housing 19 and create a snug fit. While the main body 28 of the sleeve 13 can slide into the tubular body 18 of the housing 19, the main body 28 cannot slide through the tubular body 18. This is prevented by the slight protrusion located at the base of the conical section 29, which is best shown in FIG. 3.

Located in the conical section 29 are one or more holes 35. The holes penetrate the wall of the sleeve 13 and are provided to allow a sealant to be injected into the hereinafter-described cavity in the sleeve 13 that surrounds the wire bundle 11.

FIGS. 4 and 5 are longitudinal cross-sectional views of alternative embodiments of the sleeve 13. The ends of illustrated sleeves 13 have similar sized cylindrical openings 23a, 23b and 25a, 25b. The only difference between the FIGS. 4 and FIG. 5 embodiments of the sleeve 13 is that the cylindrical openings in the FIG. 4 embodiment have a substantially smaller diameter than the FIG. 5 embodiment. Located between the cylindrical openings of both embodiments is a cavity 39. The diameter of the cavity 39 is greater than the diameter of the cylindrical openings 23a, 23b and 25a, 25b. The hole(s) 35 in the conical section 29 terminate at the cavity 39.

The outer configuration of the embodiments of the sleeves shown in FIGS. 4 and 5 is substantially the same. As will be readily appreciated by those skilled in this art and others, sleeves with opening/cavity diameter arrangements other than that shown in FIGS. 4 and 5 can be used when practicing this invention. Likewise, it is to be understood that sleeves with cavity and/or exterior shapes other than those shown in the drawings can be used when practicing this invention.

The housing 19, including the tubular body 18 and the cover plate 17, is formed of a fireproof material, preferably a metal, such as a steel alloy or a nickel alloy, or a fireproof polymer, such as Polyether Ether Keytone (PEEK) thermoplastic injection molding resin of sufficient strength and rigidity. The cover plate is attached to the tubular body in any suitable manner-welding, for example. The seam between the cover plate and the tubular body is, of course, fully filled by the attachment media, or a suitable sealant, if necessary.

The sleeve 13 is preferably a composite structure formed of layers of fiber cloth embedded with a high temperature elastomeric material, i.e., a silicone rubber. Suitable elastomeric materials are RS-1254 available from Rhone Poulenc, Monmouth Junction, N.J., and SWS 7250 with 2.0 pph Keri Iron Oxide available from Wacker Chemical Co., Adrian, Mich. After being laid up, the sleeve is placed in a suitably shaped mold and cured in an autoclave. Suitable fiber glass cloth materials are available from a wide variety of sources, including Clark-Schwebel Fiber Glass Corp., Anderson, S.C., Asahi-Schwebel Co. Ltd., Moriyama, Japan, Hexel Corporation, Sequin, Tex. and BGP Industries, Inc., Greensboro, N.C. Preferably, a minimum of two plies of cloth are included in the thinnest regions of the sleeve, namely, the region of the sleeve surrounding the cavity 39, and a minimum of five plies of cloth are included in the large regions of the sleeve, namely, the region of the sleeve surrounding the area below the cavity 39.

While the invention can be used with individual wires, preferably the invention is incorporated into wire bundles as they are formed. Wires are passed through the sleeve 13 and the tubular housing 19, which are spaced apart, as a wire bundle is formed.

During installation, the connectors on one end of the wire bundle are passed through the hole 32 (FIG. 2) in the bulkhead 21 in which the fireproof electrical wire housing is to be mounted. The diameter of the hole 32 is, of course, slightly larger than the diameter of the tubular body 18 of the housing 19. Then, the tubular body 18 of the housing is inserted through the hole and the holes in the cover plate 17 aligned with predrilled holes in the bulkhead. Thereafter, fasteners, such as bolts 33, are used to attach the cover plate to the bulkhead. Next, the sleeve is slid into the body 18 of the tubular housing. Alternatively, the sleeve 13 can be slid into the body 18 of the tubular housing 19 before the housing is secured to the bulkhead 21. As noted above, this is a snug fit. Then, usually after the connectors on the ends of the wires of the wire bundles have been connected to equipment located in the zones on either side of the bulkhead, a sealant is injected into the cavity 39. The sealant fills the cavity and prevents the wires from sliding back and forth, as well as prevents gases and flames from passing through the sleeve. The sealant is, of course, a fireproof sealant. A suitable sealant is Dapco 18-4 with a Dapco 1-100 pier, both available from D'Aircraft Products Co., Anaheim, Calif.

While the preferred embodiment of the invention has been illustrated and described, it will be appreciated that various changes can be made therein without departing from the spirit and scope of the invention as recited in the appended claims.

The embodiments of the invention in which an exclusive property or privilege is claimed are defined as follows:

1. A fire and hermetically sealed conduit housing for use with electrical wires and other types of conduits, said fire and hermetically sealed conduit housing comprising:

a housing formed of a fireproof material including a tubular body and a cover plate extending outwardly from the body;

a sleeve formed of a nonmetallic fireproof material snugly mounted in the body, said sleeve including a cavity, said sleeve also including a main body and a neck, the outer circumference of said neck being substantially less than the outer circumference of said main body, said neck being located at one end of said sleeve and said main body being located at the other end; with said cavity located between said and a sealant formed of a fireproof material located in said cavity.

2. A fire and hermetically sealed conduit housing as claimed in claim 1, wherein said sleeve is a composite structure formed of layers of fiber cloth embedded with an elastomeric material.

3. A fire and hermetically sealed conduit housing as claimed in claim 1, wherein the body of said housing and said sleeve are cylindrical.

4. A fire and hermetically sealed conduit housing as claimed in claim 3, wherein said sleeve is a composite structure formed of layers of fiber cloth embedded with an elastomeric material.

5. A fire and hermetically sealed conduit housing as claimed in claim 3, wherein said sleeve also includes a conical section between said neck and said main body, the base of said conical section having a diameter slightly higher than the diameter of said main body.

6. A fire and hermetically sealed conduit housing as claimed in claim 5, wherein said sleeve is a composite.

7. In a barrier wall for hermetically and fire isolating one compartment of airplane from another compartment, the improvement comprising a fireproof electrical wire housing, said fireproof electrical wire housing comprising:

a housing formed of fireproof material including a tubular body and a cover plate extending outwardly from the body;

a sleeve formed of a nonmetallic fireproof material snugly mounted in said body, said sleeve including a cavity, said sleeve also including a main body and a neck, the outer circumference of said neck being substantially less than the outer circumference of said main body, said neck being located at one end of said sleeve and said main body being located at the other end; with said cavity located between said end and a sealant formed of a fireproof material located in said cavity.

8. The improvement claimed in claim 7, wherein said sleeve is a composite structure formed of layers of fiber cloth embedded with an elastomeric material.

9. The improvement claimed in claim 7, wherein the body of said housing and said sleeve are cylindrical.

10. The improvement claimed in claim 9, wherein said sleeve is a composite structure formed of layers of fiber cloth embedded with an elastomeric material.

11. The improvement claimed in claim 7, wherein said sleeve also includes a conical section between said neck and said main body, the base of said conical section having a diameter slightly larger than the diameter of said main body.

12. The improvement claimed in claim 11, wherein said sleeve is a composite.

* * * * *

UNITED STATES PATENT AND TRADEMARK OFFICE
CERTIFICATE OF CORRECTION

PATENT NO. : 5,664,810
DATED : September 9, 1997
INVENTOR(S) : E. Zielinski

It is certified that error appears in the above-identified patent and that said Letters Patent is hereby corrected as shown below:

COLUMN         LINE

5                  15-16              "end; with said cavity located between said and" should read
(Claim 1,          lines 13-14)       --end with said cavity located between said ends; and--

5                  33                 "higher" should read --larger--
(Claim 5,          line 4)

6                  4                  Before "airplane" insert --an--
(Claim 7,          line 2)

6                  7                  Before "fireproof" insert --a--
(Claim 7,          line 5)

6                  16-17              "end; with said cavity located between said end and" should
(Claim 7,          lines 14-15)       read --end with said cavity located between said ends; and--

Signed and Sealed this

Seventeenth Day of February, 1998

Attest:

BRUCE LEHMAN

Attesting Officer                Commissioner of Patents and Trademarks